US009489706B2

(12) United States Patent
Levy et al.

(10) Patent No.: US 9,489,706 B2
(45) Date of Patent: Nov. 8, 2016

(54) DEVICE AND ALGORITHM FOR CAPTURING HIGH DYNAMIC RANGE (HDR) VIDEO (75) Inventors: Noam Levy, Karmiel (IL); Guy Rapaport, Nahariya (IL)

(73) Assignee: QUALCOMM Technologies, Inc., San Diego, CA (US)

( * ) Notice: Subject to any disclaimer, the term of this patent is extended or adjusted under 35 U.S.C. 154(b) by 201 days.

(21) Appl. No.: 13/540,476

(22) Filed: Jul. 2, 2012

(65) Prior Publication Data

US 2014/0002694 A1 Jan. 2, 2014

(51) Int. Cl.
*H04N 5/355* (2011.01)
*H04N 5/232* (2006.01)
*H04N 5/235* (2006.01)
*G06T 1/20* (2006.01)
*G06T 5/50* (2006.01)
*G06T 5/00* (2006.01)
*G06T 7/00* (2006.01)

(52) U.S. Cl.
CPC ............... *G06T 1/20* (2013.01); *G06T 5/007* (2013.01); *G06T 5/50* (2013.01); *G06T 7/0034* (2013.01); *H04N 5/2355* (2013.01); *H04N 5/23267* (2013.01); *H04N 5/355* (2013.01); *G06T 2200/28* (2013.01); *G06T 2207/20208* (2013.01)

(58) Field of Classification Search
None
See application file for complete search history.

(56) References Cited

U.S. PATENT DOCUMENTS

| 7,382,931 | B2 | | 6/2008 | Kang et al. | |
|---|---|---|---|---|---|
| 7,995,097 | B2 | | 8/2011 | Tzur et al. | |
| 8,228,392 | B2 | * | 7/2012 | Siddiqui et al. | 348/216.1 |
| 8,248,486 | B1 | * | 8/2012 | Ward et al. | 348/223.1 |
| 8,564,724 | B2 | * | 10/2013 | Hong | H04N 5/2176 348/447 |
| 2003/0090592 | A1 | * | 5/2003 | Callway | G09G 5/006 348/581 |
| 2007/0040935 | A1 | * | 2/2007 | Lee | H04N 5/145 348/452 |
| 2007/0242900 | A1 | * | 10/2007 | Chen et al. | 382/294 |
| 2008/0291287 | A1 | | 11/2008 | Dvir | |
| 2010/0157078 | A1 | | 6/2010 | Atanassov et al. | |
| 2010/0183071 | A1 | * | 7/2010 | Segall et al. | 375/240.16 |
| 2010/0271498 | A1 | * | 10/2010 | Hwang et al. | 348/222.1 |
| 2010/0271512 | A1 | | 10/2010 | Garten | |

(Continued)

FOREIGN PATENT DOCUMENTS

| CN | 101888487 A | | 11/2010 |
|---|---|---|---|
| EP | 1173972 A1 | | 1/2002 |
| JP | 2004088234 A | * | 3/2004 |

OTHER PUBLICATIONS

Search Report for corresponding Great Britain Patent Application No. GB 1308910.7 dated Dec. 20, 2013.

(Continued)

*Primary Examiner* — Timothy J Henn
*Assistant Examiner* — Quan Pham
(74) *Attorney, Agent, or Firm* — Knobbe Martens Olson & Bear LLP (57) ABSTRACT

Embodiments are directed towards enabling digital cameras to digitally process a captured a Low Dynamic Range image sequence at a real time video rate, and to convert the image sequence into an High Dynamic Range (HDR) image sequence using a pipelined architecture. Two or more image frames are captured using different exposure settings and then combined to form a single HDR output frame in a video sequence. The pipelined architecture operate on adjacent image frames by performing an image alignment, an image mixing, and a tone mapping on the adjacent image frames to generate the HDR image sequence.

20 Claims, 6 Drawing Sheets

(56) References Cited

U.S. PATENT DOCUMENTS

| | | | |
|---|---|---|---|
| 2011/0085049 A1 | 4/2011 | Dolgin et al. | |
| 2011/0135208 A1* | 6/2011 | Atanassov | G06T 5/50 382/218 |
| 2011/0142370 A1* | 6/2011 | Joshi et al. | 382/307 |
| 2011/0317766 A1* | 12/2011 | Lim et al. | 375/240.16 |
| 2012/0026165 A1* | 2/2012 | Morifuji | 345/419 |
| 2012/0218442 A1* | 8/2012 | Jandhyala et al. | 348/239 |
| 2013/0028509 A1* | 1/2013 | Moon | H04N 5/2355 382/162 |
| 2014/0307960 A1* | 10/2014 | Sharma | H04N 5/23229 382/162 |

OTHER PUBLICATIONS

Kang, S. B. et al., "High Dynamic Range Video," ACM Transactions on Graphics 2003, vol. 22, Part 3, pp. 319-325.

"High dynamic range imaging," Wikipedia, the free encyclopedia, last modified Aug. 16, 2012, 12 pages, http://en.wikipedia.org/wiki/High_dynamic_range_imaging.

"Image warping," Wikipedia, the free encyclopedia, last modified Oct. 28, 2011, 2 pages, http://en.wikipedia.org/wiki/Image_warping.

Funkhouser, T., "Image Warping," Princeton University—C0S 426, Fall 2000, 16 pages.

* cited by examiner

DEVICE AND ALGORITHM FOR CAPTURING HIGH DYNAMIC RANGE (HDR) VIDEO

TECHNICAL FIELD

The present embodiments relate generally to digital video image processing and, more particularly, but not exclusively, to at least using a digital camera to implement a frame-pipelined approach that combines multiple input image frames to form a single high dynamic range (HDR) output frame in real time during video capture for a video sequence.

BACKGROUND

The dynamic range of a digital image device, such as a digital camera, is the ratio between the largest amount of light that the device can capture without saturation, to the lowest amount of light the device can accurately measure and distinguish from intrinsic image noise (electrical, thermal, etc.). Most off-the-shelf digital cameras are able to capture only a small portion of the natural illumination range of a real-world scene.

Typical digital cameras, based on CMOS (complementary metal-oxide-silicon) or CCD (charge coupled device) technologies, capture images as low dynamic range (LDR) images. LDR images often means that the dynamic range of colors of a captured image is limited or clipped. An example of such resulting images may include areas that are too dark being producing a signal which is below the intrinsic noise level of the electronic sensor and areas that are determined to be too bright being clipped to white (sometimes called saturation).

High Dynamic Range (HDR) image solutions seek to increase the illumination dynamic range that is captured, to provide a fuller range of image colors. For example, darker images might appear in various shades of gray to provide increased image details that might be present in a scene's shadow region. HDR solutions then seek to preserve details in an image that may otherwise be lost due to limiting contrast ratios. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present embodiments, reference will be made to the following Detailed Description, which is to be read in association with the accompanying drawings, in which.

DETAILED DESCRIPTION OF THE EMBODIMENTS

Various embodiments now will be described more fully hereinafter with reference to the accompanying drawings, which form a part hereof, and which show, by way of illustration, specific aspects in which the embodiments may be practiced. These embodiments may, however, take many different forms and should not be construed as limited to the embodiments set forth herein; rather, these embodiments are provided so that this disclosure will be thorough and complete, and will fully convey the scope to those skilled in the art. Among other things, the present embodiments may include methods or devices. Accordingly, the present embodiments may take the form of entirely hardware or a combination of software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "image," or "image data," refers to data that defines an image to be displayed in at least two dimensions, and may take the form of a single display of the image, or a time varying display of a sequence of images comprising multiple video frames which may be spaced in time. Further, the term "frame" represents one image within a sequence of images.

As used herein, the term "real time" refers to processing of an image (or other data) as soon as the image or image data is received or captured. Thus, real time indicates that the image is processed at least at a same rate in which the image is received (or captured). This is sometimes also referred to as "real time video rate".

The following briefly describes the embodiments in order to provide a basic understanding of some aspects. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards enabling handheld digital cameras, or other mobile devices having a digital camera component, to digitally process captured a LDR image sequence at a real time video rate, and to convert the image sequence into an HDR image sequence using a pipelined architecture. In one embodiment, images may be captured at faster than a desired final (output) frame rate, where two or more image (frames) of a scene are captured using different exposure settings. For example, the different exposure settings might include different exposure times, different f-stops, or the like. The multiple image frames are then combined to form a single HDR output frame, which may then be recorded to a video sequence (or video stream). In one embodiment, dark areas in an image frame may be replaced with pixels from a brighter image frame to brighten and enhance details of the scene; while saturated areas in an image frame may be replaced by pixels from a darker image frame to recover burned out details in the overall image. This may be performed during the pipelining of the adjacent image frames through an image alignment stage, an image mixing stage, and a tone mapping stage, as described further below.

Illustrative Operating Environments

Figure 1:
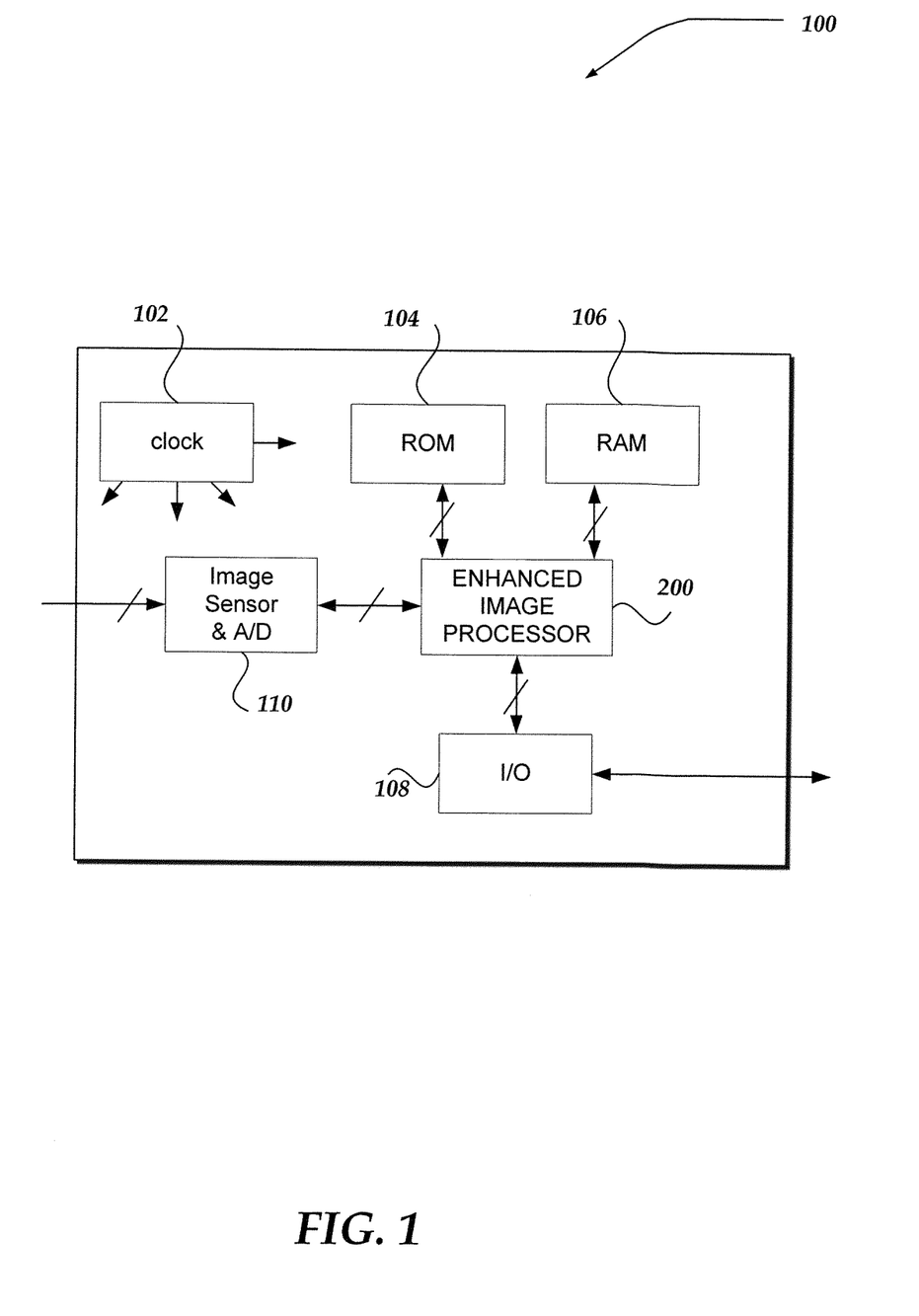
FIG. 1 illustrates a system diagram of one embodiment of an environment in which the embodiments may be practiced.

FIG. 1 shows components of an environment in which embodiments may be practiced. Not all the components may be required to practice the embodiments, and variations in the arrangement and type of the components may be made without departing from the spirit or scope of the invention. Moreover, various implementations of the system may include many more or less components than those shown in FIG. 1. However, the components shown are sufficient to disclose an illustrative embodiment for practicing the present invention.

As shown, system 100 of FIG. 1 may represent a camera or any of a variety of other possible portable devices, including cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like, that may be configurable to capture and process images, including image sequences. In one embodiment, system 100 may include components not shown, such as a lens or other optical elements, and image sensor(s) for receiving images that may be converted into a digital image for processing and subsequent storage within one or more storage devices.

As shown, system 100 may include components on a single integrated circuit chip or on a plurality of different circuit chips. In any event, components shown in FIG. 1 include a clock circuit 102 for providing clocking signals to the circuit chips and other components. While illustrated as a separate component, it should be understood that clock circuit 102 may also be included on Enhanced Image Processor (EIP) 200, or the like.

Also shown is a volatile random-access memory (RAM) circuit chip 106 that may be coupled to EIP 200 to provide temporary data storage. In one embodiment, RAM 106 may be configured to receive and store image data, such as one or more frames of image data for use by EIP 200 or output data from EIP 200, as well as to store scale factors, various statistics about an image, distortion data, depth estimation statistics, disparity map data, quantization data, and the like. A separate non-volatile read-only memory (ROM) memory chip 104 is also coupled to EIP 200 and may be employed for storage of a processor program, calibration data, look-up tables (LUTS), non-linear functions, and a variety of other data useable by system 100. In one embodiment, ROM 104 may be flash memory, which is re-programmable, or a memory that is programmable once, such as programmable read-only memory (PROM), electrically programmable read-only memory (EEPROM), or any of a variety of other storage devices.

Although not illustrated, other type of memory or physical storage devices may be included within system 100, including, for example, memory cards that may, include semi-conductor flash electrically erasable and programmable read-only memory, removable rotating magnetic disk storage, removable universal serial bus (USB) devices, or any of a variety of other storage devices. In one embodiment, system 100 may also be configured through Input/Output (I/O) device 108 to access storage devices that may be external to system 100. Thus, it should be understood that EIP 200 may be configured to receive one or more frames of image data, operate upon the received one or more frames using pipelined operations to fuse and merge information from one or more frames of a scene into a single output HDR frame of image data, compress the HDR image data, and store or otherwise send a resulting compressed (encoded) bit-stream of data using a variety of storage devices, and/or communication mechanisms. It should be understood that the bit-stream may also be sent over various communication mechanisms for display and/or storage on another device.

I/O device 108 includes circuitry for coupling system 100 to one or more external devices, networks or the like, and is constructed for use with one or more communication protocols and technologies, including any of a variety of communication protocols and technologies useable for communicating images, including images to and/or from system 100. In one embodiment, I/O device 108 is sometimes known as a transceiver, transceiving device, or network interface card (NIC).

I/O device 108 may also provide for various other communications, including for use various input devices, such as keypads, touch screens, or the like, as well as output devices including screen displays, audio outputs, or the like. Thus, although not shown, system 100 may also include a speaker and/or microphone that may be coupled to I/O device 108 to enable communications. System 100 may also include a display that may include a liquid crystal display (LCD), gas plasma, light emitting diode (LED), or any other type of display usable for providing text and/or an image for display. Further, in one embodiment, the display may also include a touch sensitive screen arranged to receive input from an object such as a stylus or a digit from a human hand.

Also illustrated is an image sensor & analog-to-digital converter (A/D) 110 that may be configured to receive an analog signal representing an image, and to convert the received signal into digital image data that, in one embodiment, may be a sequence of individual blocks of digital image data representing an intensity of light that may be received through various photo-detectors of an image sensor and/or lens arrangement (not shown). Image sensor & A/D 110 may then provide the digital data to EIP 200 for processing. In one embodiment, the data received by EIP 200 may be in a raw Bayer format. However, other data formats may also be used, including, for example, the image data may be defined by three components of the image signal; namely, a luminance component (Y), and two complementary chrominance (color differences) components (V=R−Y) and (U=B−Y).

Figure 2:
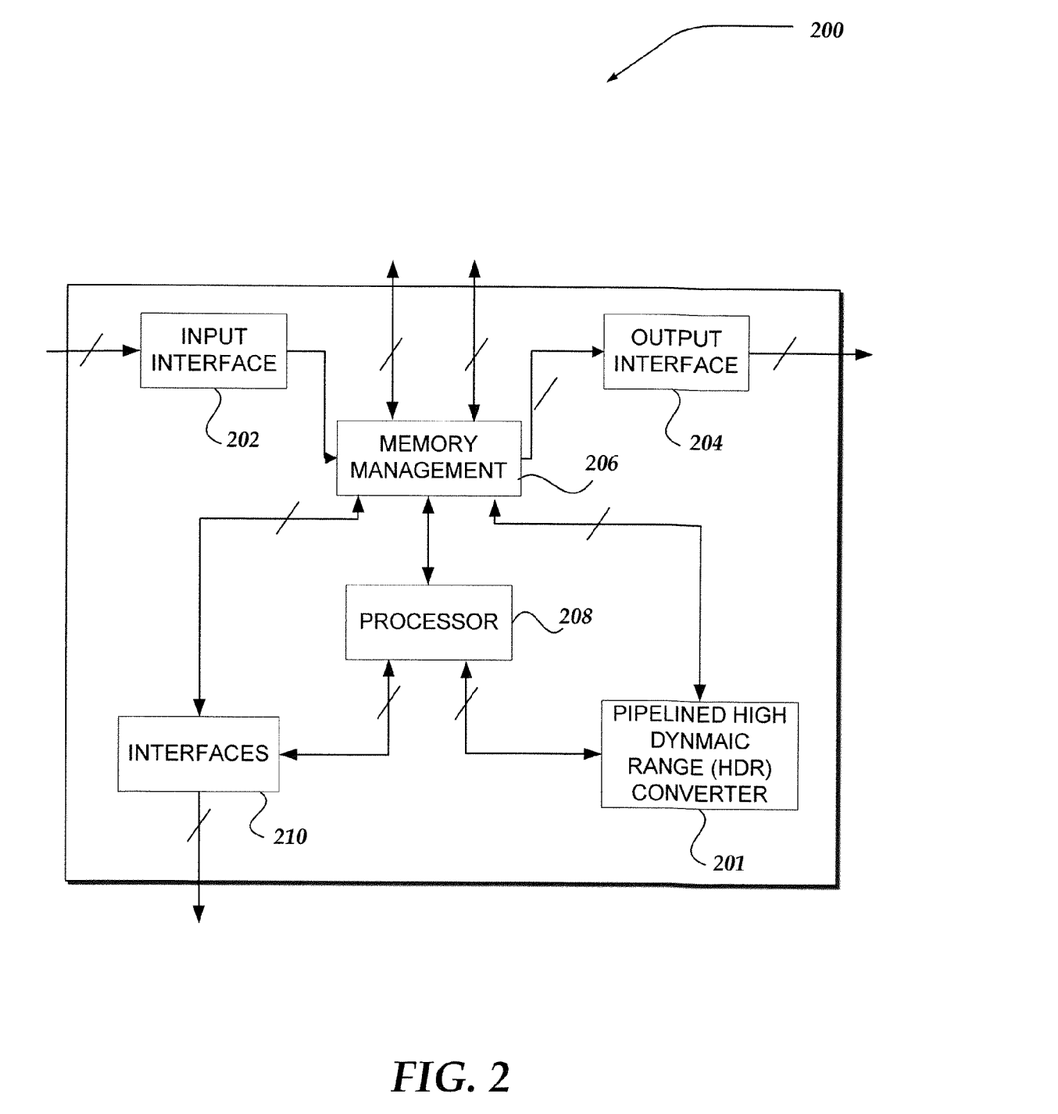
FIG. 2 shows one embodiment of an enhanced image processor having a pipelined HDR converter usable for practicing various embodiments.

One embodiment of EIP 200 is shown in FIG. 2. EIP 200 may include many more or less components than those shown. The components shown, however, are sufficient to disclose an illustrative embodiment for practicing various embodiments.

As shown in FIG. 2, EIP 200 may include processor 208 that may represent a general purpose or a specialized central processing unit (CPU) that is configured to perform a variety of calculations on an image and/or sequence of images and to control various operations of system 100 in response to computer-readable instructions that may be stored within one of the memory devices of FIG. 1, such as ROM 104, or the like. In one embodiment, digital data of one or more images may be received by input interface circuit 202 and communicated to other components by connection through memory management device 206. In one embodiment, Pipelined HDR Converter (PHC) 201 may be employed as described further below to receive in real time captured images within a sequence of images and convert them into an HDR image sequence. In one embodiment, the captured images are captured as LDR images. In one embodiment, PHC 201 may pipeline various operations on two or more images adjacent in the sequence of captured images. PHC 201 may, for example, align the adjacent images, and mix the aligned images to create an HDR image. PHC 201 may further map the HDR result into a limited bit range, such as an 8 bit range, to be displayable, for example, in a display device. The HDR image sequence may also be encoded as a compressed bit-stream that may be output through output interface circuit 204 to various memory storage devices, for display, or even over a network, including, a wireless and/or wired network, to another device.

Interfaces 210 may provide for various mechanisms to communicate with processor 208 and/or memory management 206, other components, to enable modifications to various actions, provide status of an action, or the like by another device, an end-user, or the like.

Figure 3:
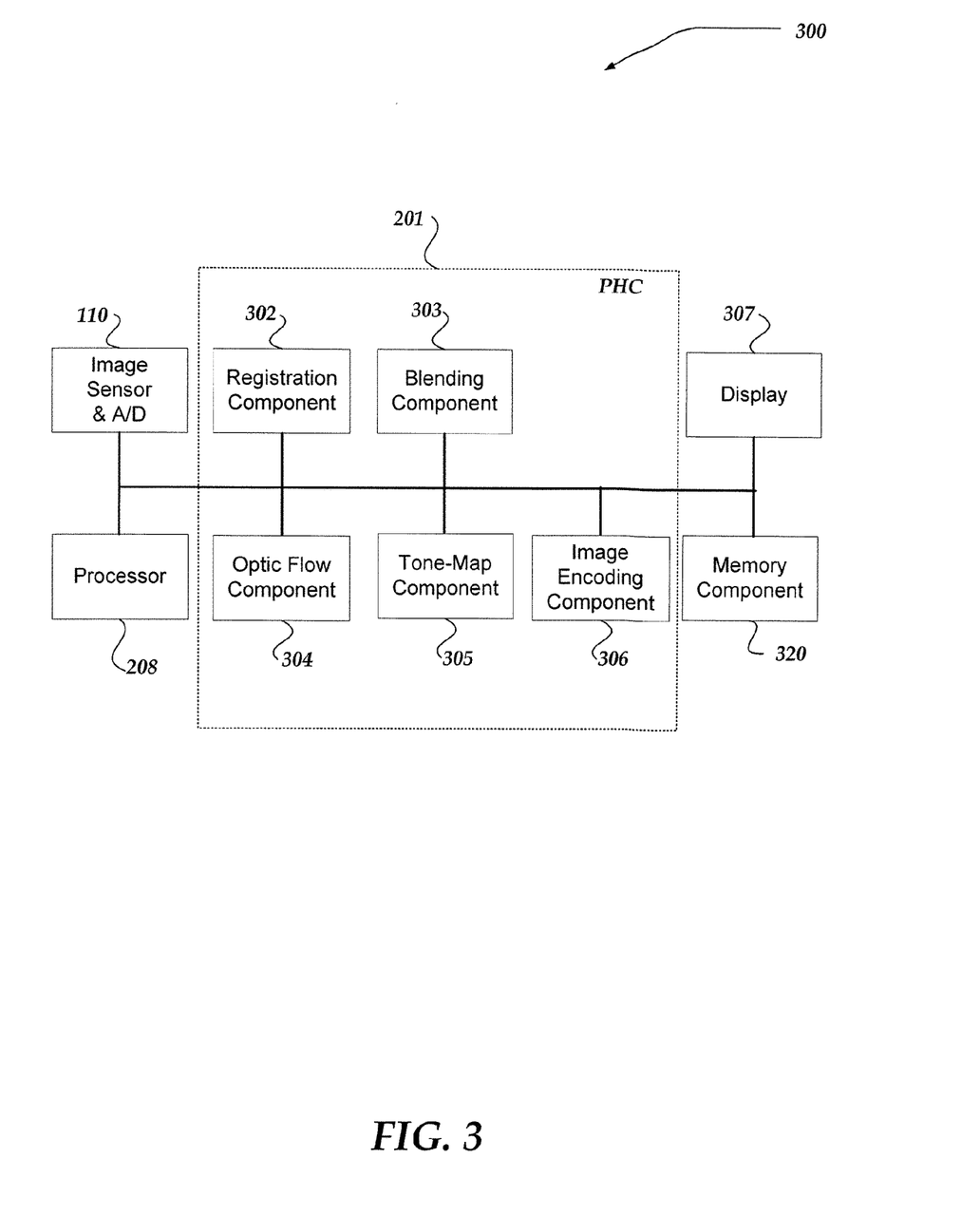
FIG. 3 illustrates one embodiment of a pipelining architecture useable to dynamically creating HDR video sequences in real time.

FIG. 3 illustrates one embodiment of a pipelined architecture useable to dynamically creating HDR video sequences in real time. Architecture 300 of FIG. 3 may include many more or less components than those shown. The components shown, however, are sufficient to disclose an illustrative embodiment for practicing various embodiments.

As shown, architecture 300 includes image sensor & A/D 110, processor 208, PHC 201, and memory component 320, each of which are described above with respect to FIGS. 1-2. For example, memory component 320 may represent ROM 104 and/or RAM 106 of FIG. 1. Architecture 300 also includes display 307 which represents any device useable to display a video sequence, and/or images. In one embodiment, display 307 may be configured to display the video sequence as an HDR video sequence.

PHC 201 also includes registration component 302, blending component 303, optic flow component 304, tone-map component 305, and image encoding component 306, each of which may represent integrated circuits elements or sub-components on an integrated circuit board, such as an application-specific integrated circuit (ASIC), or the like, where processor 208 is configured to manage the pipelining operations for architecture 300.

Briefly, image sensor & A/D 110 includes an image sensor which converts a received image to a digital representation. In one embodiment, adjacent images may be captured using different exposure settings. As used herein, the terms "exposure," "exposure value," and "ExpVal" refer to an effective amount of light hitting the image sensor. In one embodiment, where Exp Time is an exposure time, ISO represents an International Organization for Standardization (ISO) level (e.g., ISO rating), and F represents the focal (F)-number of the optical system, then exposure may be proportional to ISO*Exp Time/$F^2$.

In one embodiment, a first image might be captured with a longer (or higher) exposure time than a subsequent image. However, various other settings may be varied in addition, or instead of varying exposure times. For example, f-stops might be varied; ISO ratings might be varied between adjacent images; or the like. In one example, the first image might be considered as over-exposed to create a bright image, while an adjacent image in the sequence might be considered as under-exposed to create a dark image. In another embodiment, every odd frame in a sequence of images might be subjected to a +1 stop exposure compensation, while each even frame might be subjected to a -1 stop exposure compensation. However, other combinations may also be employed. Moreover, it should be understood, the first image in the sequence of adjacent images might have a lower or shorter exposure setting than an adjacent image.

In one embodiment, the images are captured in a raw (Bayer format). However, image sensor & A/D 110 may also convert the images to another format, such as YUV. In any event, the captured images may be placed into memory component 320 for access by the other components as appropriate. In another embodiment, the captured image may be directly passed to a next component in the pipelined sequence of components, rather than placed into memory component 320.

In any event, registration component 302 may perform image alignment including warping of one of the adjacent images with another image. Further, in one embodiment, the warping might also correct for lens distortion, and/or other issues. The processed frame may again be placed into memory 320, or passed to a next component in the pipeline.

Optic flow component 304 may be configured to perform correspondence extraction between the adjacent images, including addressing issues of possible different luminance between the images. Blending component 303 may perform various operations as disclosed below to blend portions of the adjacent images and create a single HDR frame. This HDR frame may then be submitted to tone-map component 305, to compress various tones of the image to a range matching an expected output device's configuration. For example, in one embodiment, tone-map component 305 might compress the image for an expected 8 bit output device. Other bit sizes may also be used, including for other reasons, instead of or in addition to, for an expected output device. However, it should be noted that this step may be optional where higher bit output devices are available, and/or higher bit rates are desired. Image encoding component 306 may then receive the HDR toned images and perform various encoding of the HDR image frame to a computer-readable compressed video format, including, but not limited to H.264, MPEG-4, or the like.

Figure 4:
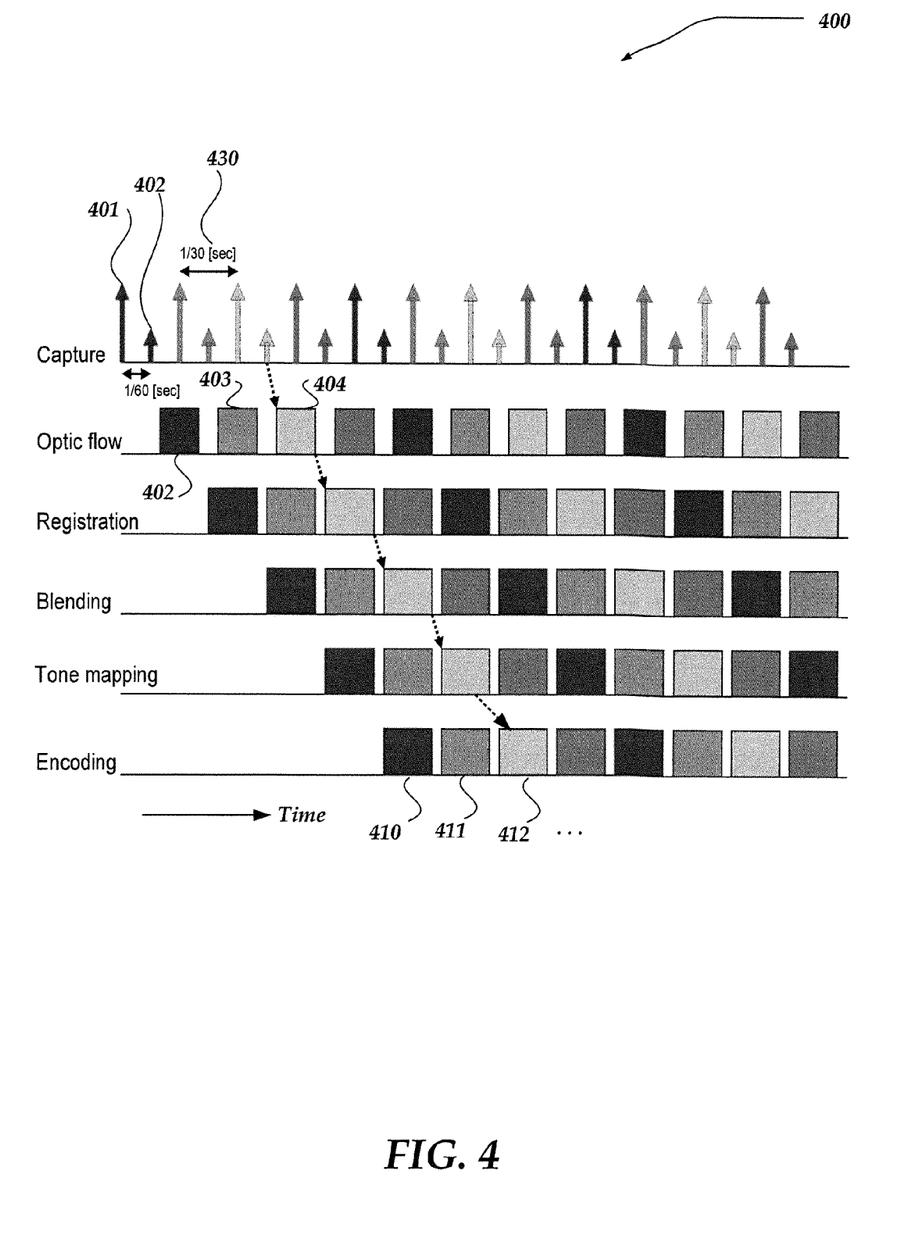
FIG. 4 illustrates one embodiment of an image flow within a pipelined architecture for dynamically creating HDR video sequences in real time from captured adjacent input frames.

FIG. 4 illustrates one embodiment of an image flow within pipelined architecture 300 of FIG. 3 for dynamically creating HDR video sequences in real time from captured adjacent input frames. Pipelining process 400 of FIG. 4 may include many more or less components than those shown. The components shown, however, are sufficient to disclose an illustrative embodiment for practicing various embodiments. As shown in FIG. 4, the pipelined operations correspond to the various components discussed above in conjunction with FIG. 3.

Pipelining process 400 shows one embodiment of how architecture 300 of FIG. 3 may be implemented in a time-lapse diagram, where time is shown as increasing from left to right, and the pipelined operations are shown on the left. Sets of adjacent images are illustrated by the blocks, such as set of adjacent images 402, as they move through the pipelined operations. For example, sequence of blocks 410-412, illustrate sets of adjacent images 402 being operated on by one operation, and then moving to another operation within the pipeline.

Set of adjacent images 402 may comprise two or more captured image frames. For example, as illustrated, adjacent images 402 may include image frames 401 and 402. As shown, an image frame may be captured every 1/60 seconds, and pipelined operations may operate over time that is divided into intervals of 1/30 second. That is, in one embodiment, images may be captured at twice a nominal frame rate.

As shown, image frame 401 is captured at a first time and at a first exposure setting (shown with an arrow). Adjacent image frame 402 is then captured at a second time (e.g., 1/60 second later) with a second exposure setting (as illustrated by an arrow at a different length than the arrow for image frame 401). It should be noted that other time frames may be selected, as well as more than two images being included within set of adjacent images 402.

In any event, as the set of adjacent images 402 are received by image sensor & A/D 110, various operations may be performed on adjacent images 402 as shown. As adjacent images 402 are operated upon in the pipeline, additional images are captured as sets of images, and processed within the pipelined architecture. Thus, as shown, set of images 402 moves through the various operations to create the sequence 410. A similar pipelining of adjacent images occurs for sequence 411, as well as each of the other sets of adjacent images, shown in FIG. 4, sequence 412, and so forth.

Thus, the conversion from an LDR image sequence to an HDR image sequence may be divided into sub tasks, each of which can be performed in a single frame time; each component described above may perform its task and then transfer the results to a next component. In one embodiment, therefore, intermediate results need not be stored in memory. While a single frame processing time might take up to about 150 msec. or more, in some embodiments, the pipelining approach as described herein allows a throughput of one frame in about 33 milliseconds. However, other time values may result. For example, in another embodiment, the frame rate (FPS) of the HDR stream might be about the same as the input stream, by combining a first and second frame to an HDR first frame, a second and third frame to an HDR second frame, and so forth.

Generalized Operation

Figure 5:
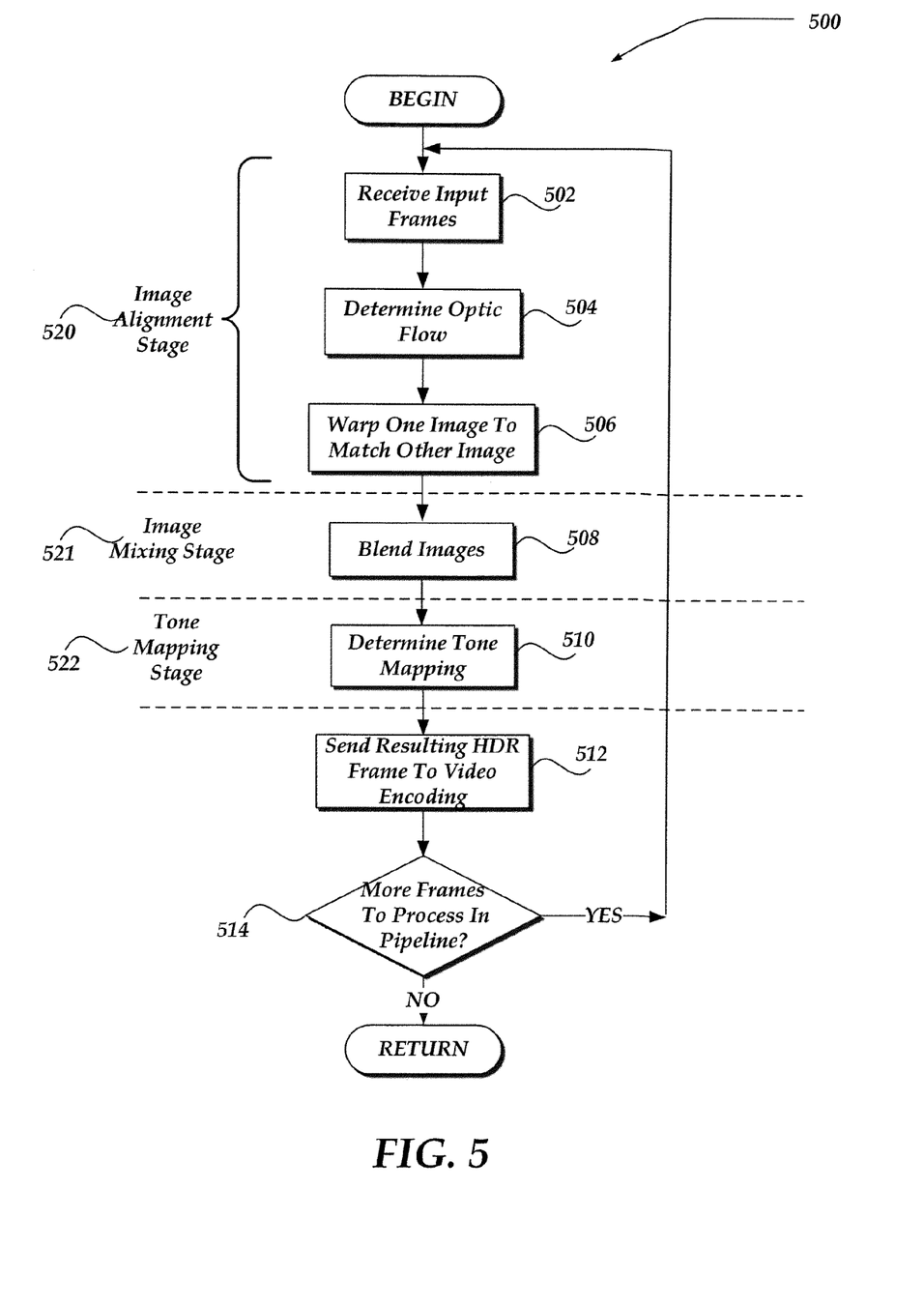
FIG. 5 illustrates one embodiment of a pipelined process flow for creating HDR video sequences in real time.

The operation of certain aspects of the invention will now be described with respect to FIG. 5. FIG. 5 illustrates one embodiment of a pipelined process flow for creating HDR video sequences in real time. As discussed above, process 500 of FIG. 5 may be implemented within the pipelined architecture of FIG. 3 within system 100 of FIG. 1.

It should be noted that while process 500 illustrates a sequential flow with a loop back (decision block 514), sets of images may be operated upon concurrently by each block. For example, using sets of images illustrated in FIG. 4, a set of images 402 may be operated upon at block 506 of process 500, while a second set of images 403 may be concurrently operated upon in the pipeline by block 504, and further, a third set of images 404 may be concurrently operated upon in the pipeline by block 502. Thus, process 500 should not be construed as operating on a single set of images before starting operations on another set of images.

Process 500 is illustrated as comprising three stages, image alignment stage 520, image mixing stage 521, and tone mapping stage 522. Briefly, image alignment is directed towards aligning the multiple images, and includes the measuring optic flow and warping of one of the images to match the other image. Image mixing is directed towards mixing the aligned images together to create the HDR single image from the multiple images, and tone mapping is directed to reducing a bit range for use in displaying or performing other actions with the resulting HDR image.

Thus, process 500 begins at block 502, where multiple adjacent frames are received. In this instance, the adjacent frames are received, for example, from image sensor & A/D 110 component of FIG. 1. As discussed above, a first image may have been captured with a different exposure setting then a second image. Further, although the discussions above related to two images, other embodiments may include receiving more than two images, each with different exposure settings.

Processing then progresses to block 504 where the optic flow is determined. As discussed above, process 500 combines pixel information between the received two or more image frames in order to generate a single HDR output. In order to avoid unwanted artifacts, such as image blurring or ghosting, the received image frames are aligned. Alignment is directed to identifying a same object within the scene captured in the multiple images, and ensuring that they are in a same position within each of the image frames.

Since the images are likely captured from a hand-held camera, the camera may move slightly between image frames; this will cause the image to move or rotate between captured image frames. To compensate, estimates of how to move one image in order to be aligned with another image are performed.

In one embodiment, one approach to aligning the images includes attempting to estimate a parametric function T: $R^2 \rightarrow R^2$, which is directed towards representing the relationship between image coordinates in one image and image coordinates in at least the second image; in one embodiment, several such functions are estimated—one for each object in the image. One example of this function includes the affine function:

$$x'=a_{11}x+a_{12}y+a_{13} \quad y'=a_{21}x+a_{22}y+a_{23}$$

In order to estimate the model, the motion vectors between corresponding pixels in the two or more images are first extracted, and then the global motion transform is estimated.

Motion Vector Extraction

In motion vector extraction, a first step is to find correspondences between the multiple images, and includes finding which locations in one image match locations in another image.

Virtually any motion search motion may be used. However, in one embodiment, a motion search scheme such as described in U.S. Patent Publications No.: 2008/0291288, filed on May 25, 2007, entitled "Technique of Motion Estimation When Acquiring An Image of A Scene That May Be Illuminated With A Time Varying Luminance," by Tzur; Meir; Pinto; Victor, and Pinhasov; Eran (which is incorporated herein by reference in its entirety) may be used. It is noted that embodiments herein are not limited to using this technique, and others may also be used.

In any event, the motion search may employ a Mean-Reduced Sum of Absolute Differences (MRSAD) based approach in one embodiment. That is, a motion of a block of pixels in one image frame may be determined by a location of a block in the other image frame for which the MRSAD is determined to be minimal. Here, one image frame can be denoted as a 'target'—$I_T$, and the other image frame as a 'reference'—$I_R$. Then:

$$MRSAD(x, y, u, v) = \sum_{i=0}^{B_X-1} \sum_{j=0}^{B_Y-1} |I_T(x+i, y+j) - I_R(x+u+i, y+v+j) - M_T(x, y) + M_R(x, y)|$$

where:

$$M_T(x, y) = \frac{1}{B_X B_Y} \sum_{i=0}^{B_X-1} \sum_{j=0}^{B_Y-1} I_T(x+i, y+j)$$

$$M_R(x, y) = \frac{1}{B_X B_Y} \sum_{i=0}^{B_X-1} \sum_{j=0}^{B_Y-1} I_R(x+i, y+j)$$

Then:

$$(MV_x(x, y), MV_y(x, y)) = \arg\min_{\substack{-A_X \leq u \leq A_X \\ -A_Y \leq v \leq A_Y}} (MRSAD(x, y, u, v))$$

Where, $B_X$, $B_Y$ define a size of a block and $A_X$ and $A_Y$ define a search area.

In one embodiment, the motion search may be performed relatively quickly using specific hardware accelerators implemented on an integrated circuit, such as might be employed in system 100 of FIG. 1, which accepts the reference and target images and returns a list of 'motion vectors,' for each block in the images. In addition, the motion search can be performed on a low resolution copy of the images, and then refined by performing an additional search in higher resolution. Moreover, the motion search can be further improved by applying corner detection on the images, since corners are more likely to return reliable motion vectors. In addition, in one embodiment, a robustness measure can be extracted by observing the MRSAD map as a function of the (u, v) motion vector, and determining whether the minima that is produced, MV(x, y), is unique.

Global Motion Estimation

Block 504 may then continue by performing a global motion estimation for the multiple received image frames. Thus, after the motion search, a set of correspondences in each image set is obtained as:

$$(x_i, y_i) \leftrightarrow (x_i', y_i') = (x_i + MV_x(x_i, y_i), y_i + MV_y(x_i, y_i))$$

In one embodiment, a RANdom Sample Consensus (RANSAC) approach is used to estimate a transformation from these correspondences. Other approaches may also be used instead, however. Therefore, it is noted that embodiments are not constrained to this approach. In any event, using this approach, the transformation estimates can be built iteratively, with outliers being rejected. A final transformation may be calculated by taking a group of all inliers (which may be labeled 'I") and estimating a transformation by a least squares (linear regression) equation:

$$\begin{pmatrix} a_{11} \\ a_{12} \\ a_{13} \end{pmatrix} = \begin{pmatrix} \sum x_i^2 & \sum y_i x_i & \sum x_i \\ \sum y_i x_i & \sum y_i^2 & \sum y_i \\ \sum x_i & \sum y_i & N \end{pmatrix}^{-1} \begin{pmatrix} \sum x_i x_i' \\ \sum y_i x_i' \\ \sum x_i' \end{pmatrix}$$

$$\begin{pmatrix} a_{21} \\ a_{22} \\ a_{23} \end{pmatrix} = \begin{pmatrix} \sum x_i^2 & \sum y_i x_i & \sum x_i \\ \sum y_i x_i & \sum y_i^2 & \sum y_i \\ \sum x_i & \sum y_i & N \end{pmatrix}^{-1} \begin{pmatrix} \sum x_i y_i' \\ \sum y_i y_i' \\ \sum y_i' \end{pmatrix}$$

where the summation is over $\forall i \in I$, and $N = |I|$.

It is noted that all the summations can be performed in fixed point arithmetic, while the matrix inversions employ floating point arithmetic, which may be done a few times. It may also be emulated in software, and may not require floating point hardware support, further reducing complexity, and increasing speed.

As noted, while the affine transform above is given as an example approach, it should be clear that many other parametric transformation approaches can also be used.

Processing may next flow from block 504, to block 506, where using the estimated global transformation, any of a variety of warping mechanisms may be used to transform one of the images onto the other image's coordinates.

Process 500 next flows to block 508 where image mixing is performed. At the image mixing stage 521, the already aligned images are blended together, in one embodiment, by following an intuitive rule: the dark image (as mentioned above) should contribute information in over-exposed areas and the bright image (as mentioned above) assists in under-exposed areas of the resulting blended image.

In one embodiment, the image mixing operations take the two images with different exposures and blend them together according to a pixel-wise blend factor. This approach may be described by denoting the image which is defined as being less exposed as $I_1$ and the image with greater exposure as $I_2$. The exposure value of each image may be denoted as $ExpVal_1$ and $ExpVal_2$, respectively. This can readily be extended for more images.

In one embodiment, the exposure values, ExpVal, may be calculated as:

$$ExpVal = \frac{ISO \cdot ExpTime}{F_\#^2}$$

Where ISO represents an International Organization for Standardization (ISO) level, ExpTime represents the exposure time, and $F_\#$ represents the focal (F)-number of the optical system.

The following actions then may be applied within the image mixing stage:

1. In a pre-processing step:
   a. If $I_1$ or $I_2$ are given in the gamma domain, rather than in a linear domain, then a de-gamma operation is applied in order to represent the input images in a linear domain. Any of a variety of mechanisms may be used to perform this de-gamma operation.
   b. Next, the brighter image, $I_2$, is normalized to an exposure value of the darker image, $I_1$. In one embodiment, the manipulations on the input image can be summarized as:

$$\begin{cases} I_1^{upd} = DeGamma(I_1) \\ I_2^{upd} = DeGamma(I_2) \cdot \dfrac{ExpVal_1}{ExpVal_2} \end{cases}$$

2. Calculating blending weights.

Figure 6:
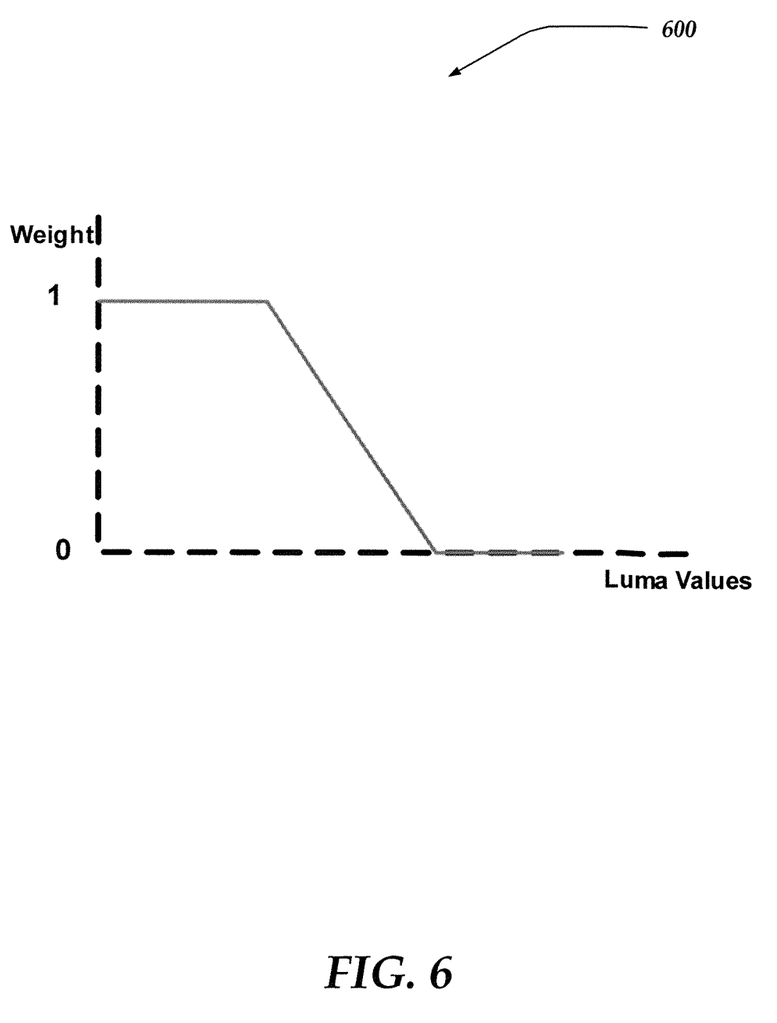
FIG. 6 illustrates one non-limiting, non-exhaustive one-dimensional example of a weighting look up table function using in blending weights.

In order to determine weights, luminosity values, where Luma is denoted as Y) of the brighter image, $I_2$, are used as an input to a weighting Lookup-Up Table (LUT). This can be formulated as W=LUT ($Y_2$). The weighting LUT can be described as a general mapping, but may also be implemented as a piece-wise linear function. FIG. 6 illustrates one non-limiting, non-exhaustive one-dimensional example of a weighting look up table function as a piece-wise linear function. It should be understood that other weighting functions may also be used.

3. Mixing.

The actual mixing operation is performed at block 508 by applying:

$$I_{out} = (1-W) \cdot I_1^{upd} + W \cdot I_2^{upd}$$

with W representing the weight LUT, such as shown in FIG. 6. The mixing operation then takes the dark pixels from $I_2^{upd}$, bright pixels from $I_1^{upd}$, and performs a pixel-wise blending between the two images for medium Luma values.

In one embodiment, misalignments of the images (errors of stage 506) are detected. This could be done for example by observing the difference between the (normalized) image pixels and applying a threshold. Where such misalignments are detected, the weighting factor W can be pushed closer to 0 or 1 (for example, rounded) in order to avoid blending misaligned objects and creating 'ghosts'—meaning semi-transparent objects in the output image, or the like.

At a completion of block 508, a HDR image results that may be represented, in one embodiment, as a linear RBG image. In one embodiment, the RBG image may use 12 bits per color component. Thus, where it is expected that the output device is configured for use of images having a lower number of bits per color, processing may optionally proceed to block 510, the tone mapping stage 522, block 510 of process 500.

In tone mapping, the 12 bit representation may be transformed to a lower bit representation. For example, in one embodiment, the transformation may be to an 8 bit per color representation. In this action, it is desirable to perform the tone mapping while preserving the perceptual added-value of the image fusion process above.

While any of a variety of techniques may be employed, the following provides one embodiment of an approach using two distinct transformations, a global mapping, and a local mapping.

Thus, at block 510, global mapping may be performed using a gamma-like mapping on the HDR fusion result, while still maintaining 12 bits per color component. The mapping may include an inverse of the de-gamma operation that was discussed earlier above, at block 508. While other approaches may be used, it is desirable to maintain similarity to colors and atmosphere of the input images.

Local mapping may include, in one embodiment, performing a non-linear, local mapping, such as described in U.S. Patent Publication, No. 2008/0291287, filed May 23, 2007, entitled "Dynamic Range Compensation by Filter Cascade," by Dvir; Itsik, which is incorporated herein by reference in its entirety. Other approaches may also be used; thus, embodiments are not constrained to this approach. For example, the approach described in U.S. Patent Publication, No. 2008/0292206, filed May 23, 2007, entitled "Highlight Recovery Using Digital Lighting Module," which is also incorporated herein by reference in its entirety, may also be used.

In any event, in one embodiment, a non-linear operation may be used that maps a pixel according to its neighbor's average luminosity values into an 8 bit representation per color component. This tone mapping operation provides dynamic range compression, while preserving local contrast, to minimize damage to local contrast.

The HDR image frame from block 510 may then be provided to block 512, where any of a variety of encoding mechanisms may be used to encode the HDR image frame as a compressed bit-stream, including, but not limited to H.264, MPEG-4, or the like.

Processing the proceeds to decision block 514, where a determination is made whether there are more image frames to be processed using the pipelined operations. If so, then processing may loop back to block 502; otherwise, processing may return to another process. As noted above, because process 500 pipelines sets of images, process 500 need not loop back, but may continue operations of various blocks described above, until all of the sets of images captured by the digital camera have been processed into HDR image frames.

Moreover, it will be understood that each component of the flowcharts and combinations of components in these illustrations, can be implemented by computer program instructions. These program instructions may be provided to a processor to produce a machine, such that the instructions, which execute on the processor, create means for implementing the actions specified in the flow component or components. The computer program instructions may be executed by a processor to cause a series of operational steps to be performed by the processor to produce a computer-implemented process such that the instructions, which execute on the processor to provide steps for implementing the actions specified in the flow component or components. The computer program instructions may also cause at least some of the operational steps shown in the components of the flows to be performed in parallel/pipelined. Moreover, some of the steps may also be performed across more than one processor, such as might arise in a multi-processor computer system. In addition, one or more components or combinations of components in the flow illustrations may also be performed concurrently with other components or combinations of components, or even in a different sequence than illustrated.

Accordingly, components of the flow illustrations support combinations of means for performing the specified actions, combinations of steps for performing the specified actions and program instruction means for performing the specified actions. It will also be understood that each component of the flow illustrations, and combinations of components in the flow illustrations, can be implemented by special purpose hardware-based systems, which perform the specified actions or steps, or combinations of special purpose hardware and computer instructions.

What is claimed as new and desired to be protected by Letters Patent of the United States is:

1. A processor based method for pipelining a plurality of actions at a real-time video rate to generate a high dynamic range (HDR) video output stream, comprising:

capturing a plurality of images as low dynamic range images, at least one image having a different exposure setting than at least one other image in the plurality of images;

performing image alignment between the images in the plurality of images;

determining misaligned pixels between the images via comparing the difference between corresponding pixels of the images to a threshold;

creating an HDR image by combining each of the aligned images with each other aligned image based on at least a pixel-wise blending, the blending comprising pushing a weighting value closer to one of first and second whole numbers closest to the weighting value when the difference between the corresponding pixels of the images is greater than the threshold, the first whole number being less than the weighting value and the second whole number being greater than the weighting value, the pushing comprising: i) pushing the weighting value closer to the first whole number when the weighting value is closer to the first whole number than the second whole number, and ii) pushing the weighting value closer to the second whole number when the weighting value is closer to the second whole number than the first whole number, the pushed weighting value being applied to the misaligned pixels in a selected one of the images being blended; and encoding the HDR image into a HDR video output stream.

2. The processor based method of claim 1, wherein performing image alignment further comprises:

performing a motion vector extraction between corresponding pixels between the images; and employing a result of the motion vector extraction transforming the images onto image coordinates of at least one of the images in the plurality of images.

3. The processor based method of claim 2, wherein the motion vector extraction further comprises:

employing a motion search using a motion of a block of pixels in at least one of the images to identify another block of pixels in at least one other image in the plurality based on when a mean reduced sum of the absolute differences (MRSAD) is determined to be minimal;

using a result of the motion search to identify a set of correspondences between pixels in at least one of the images with pixels in at least one other image; and performing a global motion estimation on the set of correspondences to generate an estimated global transformation.

4. The processor based method of claim 3, wherein the motion search further includes performing a corner detection on at least one of the images and at least one other image in the plurality.

5. The processor based method of claim 1, wherein combining the aligned images further comprises:

for each image in the plurality that is represented in a gamma non-linear domain, performing a de-gamma transformation on the image;

normalizing a respective image having a brighter exposure setting than another darker image in the plurality, to an exposure value of the other darker image;

determining weighting values based in part on luminosity values of the image having the brighter exposure setting; and using the weighting values to blend dark pixels from the brighter image with bright pixels from the darker image to generate the HDR image.

6. The processor based method of claim 1, wherein pipelining a plurality of actions, further comprises:

performing a tone mapping to reduce a number of bits used to represent a color component in the HDR image, the tone mapping including:

performing a gamma global mapping on the HDR image; and performing a non-linear local mapping that maps a pixel based on a neighbor of the pixels' average luminosity value.

7. The processor based method of claim 1, wherein the different exposure setting is different in at least one of an exposure time, an f-number, or an International for Standardization (ISO) level.

8. An image system, comprising:

an image sensing device configured to receive a plurality of images as low dynamic range images; and one or more circuits having a plurality of components thereon operating in a pipeline architecture to perform a plurality of actions at a real-time video rate for a sequence of captured images, including:

receiving the plurality of images, at least one image captured with a different exposure setting than at least one other image in the plurality of images;

performing image alignment between the images;

determining misaligned pixels between the images via comparing the difference between corresponding pixels of the images to a threshold;

creating a high dynamic range (HDR) image by combining each of the aligned images with each other aligned image using a pixel-wise blending, the blending comprising pushing a weighting value closer to one of first and second whole numbers closest to the weighting value when the difference between the corresponding pixels of the images is greater than the threshold, the first whole number being less than the weighting value and the second whole number being greater than the weighting value, the pushing comprising: i) pushing the weighting value closer to the first whole number when the weighting value is closer to the first whole number than the second whole number and ii) pushing the weighting value closer to the second whole number when the weighting value is closer to the second whole number than the first whole number, the pushed weighting value being applied to the misaligned pixels in a selected one of the images being blended; and encoding the HDR image into an HDR video output stream.

9. The image system of claim 8, wherein performing image alignment further comprises:

performing a motion vector extraction between corresponding pixels between the images; and employing a result of the motion vector extraction transforming the images onto image coordinates of at least one image in the plurality.

10. The image system of claim 9, wherein the motion vector extraction further comprises:

employing a motion search using a motion of a block of pixels in at least one of the images to identify another block of pixels in at least one other image based on when a mean reduced sum of the absolute differences (MRSAD) is determined to be minimal;

using a result of the motion search to identify a set of correspondences between pixels in the images; and performing a global motion estimation on the set of correspondences to generate an estimated global transformation.

11. The image system of claim 10, wherein the motion search further includes performing a corner detection on the images.

12. The image system of claim 8, wherein blending further comprises for saturated areas within one of the images, using pixels from a darker image in the plurality to recover burned out details in a scene when creating the HDR image.

13. The image system of claim 8, wherein the different exposure setting is different in at least one of an exposure time, an f-number, or an International for Standardization (ISO) level.

14. The image system of claim 8, wherein the pipelined plurality of actions, further comprises:
performing a tone mapping to reduce a number of bits used to represent a color component in the HDR image, the tone mapping including:
performing a gamma global mapping on the HDR image; and
performing a non-linear local mapping that maps a pixel based on a neighbor of the pixels' average luminosity value.

15. A storage device having stored thereon a plurality of computer-executable instructions that when installed on a digital camera performed actions, comprising:
iteratively performing within a pipelined architecture using the computer-executable instructions to perform actions for images within a sequence of images, including:
capturing a first image with a first exposure setting;
capturing a second image with a second exposure setting that is different from the first exposure setting, the first image and the second image being captured as low dynamic range images;
performing image alignment between the first image and the second image;
determining misaligned pixels between the first image and the second image via comparing the difference between corresponding pixels of the first and second images to a threshold;
creating a high dynamic range (HDR) image by blending the aligned first image and the second image using a pixel-wise blending, the blending comprising pushing a weighting value closer to one of first and second whole numbers closest to the weighting value when the difference between the corresponding pixels of the first and second images is greater than the threshold, the first whole number being less than the weighting value and the second whole number being greater than the weighting value, the pushing comprising: i) pushing the weighting value closer to the first whole number when the weighting value is closer to the first whole number than the second whole number and ii) pushing the weighting value closer to the second whole number when the weighting value is closer to the second whole number than the first whole number, the pushed weighting value being applied to the misaligned pixels in a selected one of the images being blended; and
encoding the HDR image into an HDR video output stream.

16. The storage device of claim 15, wherein performing image alignment further comprises:
performing a motion vector extraction between corresponding pixels between the images; and
employing a result of the motion vector extraction transforming one of the first image or the second image onto image coordinates of the other of the second image or the first image.

17. The storage device of claim 16, wherein the motion vector extraction further comprises:
employing a motion search using a motion of a block of pixels in the first image to identify another block of pixels in the second image based on when a mean reduced sum of the absolute differences (MRSAD) is determined to be minimal;
using a result of the motion search to identify a set of correspondences between pixels in the first image with pixels in the second image; and
performing a global motion estimation on the set of correspondences to generate an estimated global transformation.

18. The storage device of claim 15, wherein blending further comprises for saturated areas within one of the first image or second image, using pixels from a darker image among the first image and the second image to recover burned out details in a scene when creating the HDR image.

19. The storage device of claim 15, wherein the first exposure setting and the second exposure setting are different in at least one of an exposure time, an f-number or an International for Standardization (ISO) level.

20. The storage device of claim 15, wherein the pipelined plurality of actions, further comprises:
performing a tone mapping to reduce a number of bits used to represent a color component in the HDR image, the tone mapping including:
performing a gamma global mapping on the HDR image; and
performing a non-linear local mapping that maps a pixel based on a neighbor of pixels' average luminosity value.

* * * * *